United States Patent
McCaffrey et al.

(10) Patent No.: US 10,309,243 B2
(45) Date of Patent: Jun. 4, 2019

(54) GROOVED BLADE OUTER AIR SEALS

(71) Applicant: UNITED TECHNOLOGIES CORPORATION, Farmington, CT (US)

(72) Inventors: Michael G McCaffrey, Windsor, CT (US); Alan C. Barron, Jupiter, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 626 days.

(21) Appl. No.: 14/708,746

(22) Filed: May 11, 2015

(65) Prior Publication Data

US 2015/0337672 A1    Nov. 26, 2015

Related U.S. Application Data

(60) Provisional application No. 62/002,432, filed on May 23, 2014.

(51) Int. Cl.

| | |
|---|---|
| *F01D 11/08* | (2006.01) |
| *F01D 25/14* | (2006.01) |
| *B25J 9/16* | (2006.01) |
| *B25J 11/00* | (2006.01) |
| *F01D 9/02* | (2006.01) |

(Continued)

(52) U.S. Cl.
CPC ............. *F01D 11/08* (2013.01); *B25J 9/1697* (2013.01); *B25J 11/0055* (2013.01); *F01D 9/02* (2013.01); *F01D 9/04* (2013.01); *F01D 11/12* (2013.01); *F01D 11/122* (2013.01); *F01D 25/145* (2013.01); *F01D 25/24* (2013.01); *F05D 2220/30* (2013.01); *F05D 2230/90* (2013.01); *F05D 2240/55* (2013.01); *Y10S 901/10* (2013.01)

(58) Field of Classification Search
CPC ......... F01D 11/08; F01D 11/12; F01D 11/122
See application file for complete search history.

(56) References Cited

U.S. PATENT DOCUMENTS

| | | | |
|---|---|---|---|
| 6,830,428 B2 * | 12/2004 | Le Biez | F01D 5/20 415/173.4 |
| 8,939,705 B1 * | 1/2015 | Lee | F01D 11/122 415/1 |

(Continued)

FOREIGN PATENT DOCUMENTS

WO          98/51906          11/1998

OTHER PUBLICATIONS

European Search Report for EP Application No. 15168480.0 dated Oct. 14, 2015.

*Primary Examiner* — Justin D Seabe
*Assistant Examiner* — Sabbir Hasan
(74) *Attorney, Agent, or Firm* — Cantor Colburn LLP

(57) ABSTRACT

A blade outer air seal for a turbomachine includes a base portion configured to attach to a turbomachine housing, a thermal coating disposed on the base portion, and at least one groove defined in an external surface of the thermal coating. The groove can be machined. A method of manufacturing a blade outer air seal includes disposing a thermal coating on a base portion, and machining at least one groove into the thermal coating. The method can also include using an automated force sensing and vision sensing equipped robotic system.

15 Claims, 5 Drawing Sheets

Blade Path

(51) Int. Cl.
*F01D 9/04* (2006.01)
*F01D 11/12* (2006.01)
*F01D 25/24* (2006.01)

(56) References Cited

U.S. PATENT DOCUMENTS

2003/0175116 A1 9/2003 Le Biez et al.
2006/0110248 A1 5/2006 Nelson et al.
2012/0034847 A1 2/2012 Besse et al.
2012/0079883 A1 4/2012 Provost et al.

* cited by examiner

Fig. 2A
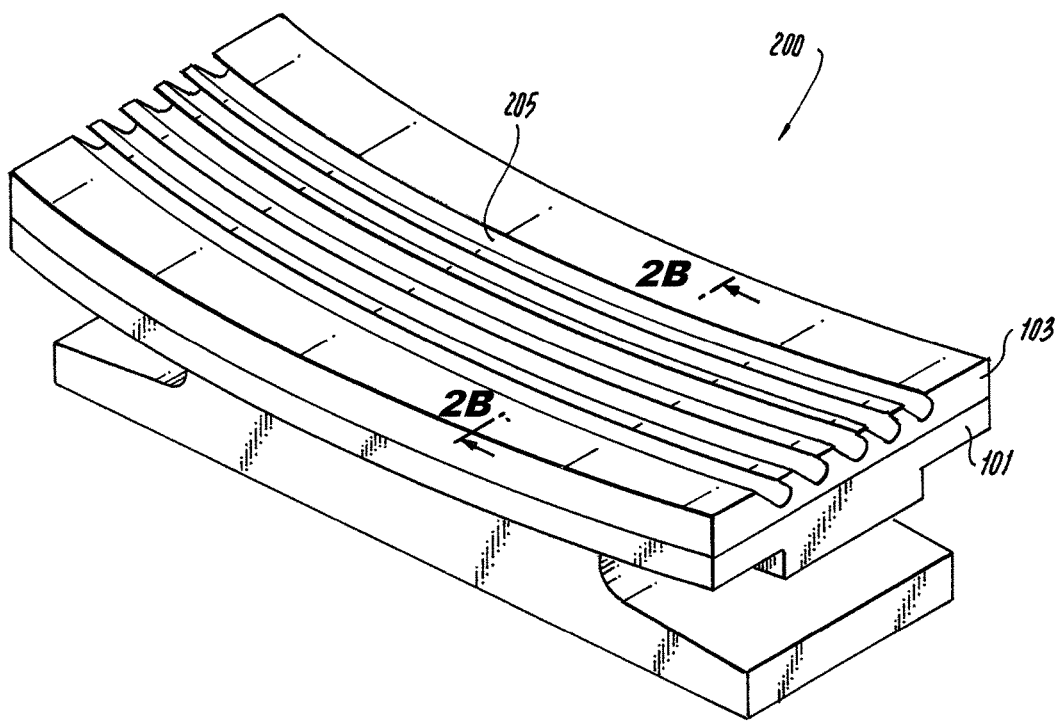
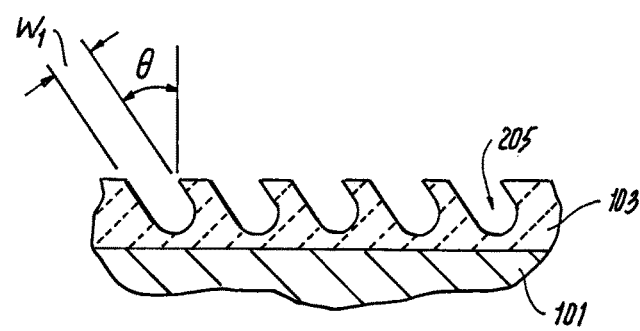
Fig. 2B

GROOVED BLADE OUTER AIR SEALS

CROSS-REFERENCE TO RELATED APPLICATION

This application claims the benefit of priority under 35 U.S.C. § 119(e) to U.S. Provisional Application No. 62/002,432, filed May 23, 2014, which is incorporated herein by reference in its entirety.

BACKGROUND

1. Field

The present disclosure relates to turbomachine components, more specifically to blade outer air seals (BOAS).

2. Description of Related Art

BOAS are dynamic seals that prevent airflow from traveling around the blade tips of turbomachine blades while the turbomachine blades are spinning. BOAS are specifically designed to reduce the gap distance between the tip of the blades and the BOAS in order to prevent airflow from traveling around the blade tips.

BOAS design involves a tradeoff between an effective seal by minimizing gap distance and blade tip wear. Traditional BOAS are intentionally designed to be worn down by the blades during a break in period, which can result in the blade tips experiencing wear or damage. Also, even after break-in, differing aerodynamic, inertial, and thermal stresses can cause the blades to expand outwardly and further wear into the BOAS.

To address this, typical BOAS include an abradable coating on the thermal ceramic surface thereof to allow the blade to dig into the BOAS with reduced wear and damage. Abradable coatings add complexity and cost to the design of the BOAS. Also, abradable coatings are typically applied in a smooth fashion resulting in a smooth, strong surface which can potentially create a significant amount of blade tip wear during break-in.

Such conventional methods and systems have generally been considered satisfactory for their intended purpose. However, there is still a need in the art for improved BOAS. The present disclosure provides a solution for this need.

SUMMARY

In at least one aspect of this disclosure, a blade outer air seal for a turbomachine includes a base portion configured to attach to a turbomachine housing, a thermal coating disposed on the base portion, and at least one groove defined in an external surface of the thermal coating. The groove can be machined. The base portion can include a metal. The thermal coating can include a ceramic.

The at least one machined groove can be linear. In certain embodiments, the at least one groove is at least partially radially aligned with respect to a longitudinal axis defined by the base portion. The at least one groove can be at least partially axially aligned with respect to a longitudinal axis defined by the base portion. It is also contemplated that the at least one groove can be disposed at an oblique angle relative to an axial direction of the turbomachine. In certain embodiments, the at least one machined groove defines a non-linear shape. In some embodiments, the at least one machined groove includes an undercut created by contacting a cutting device to the thermal coating at a non-right angle relative to the surface of the thermal coating.

In certain embodiments, the at least one machined groove includes a first groove and at least one second groove at least partially intersecting the first groove. It is also contemplated that the first groove can be machined into the thermal coating to a first depth and the second groove can be machined into the thermal coating at a second depth. In certain embodiments, a first portion of the thermal coating includes a first groove type and a second portion of the thermal coating includes a second groove type.

In at least one aspect of this disclosure, a method of manufacturing a blade outer air seal includes disposing a thermal coating on a base portion, and machining at least one groove into the thermal coating.

It is contemplated that machining can further include using a robotic machining system including a tactile sensing and vision sensing cutting device, both integrated in the robot controller, configured to control a groove dimension. In certain embodiments, the machining further includes contacting a cutting device to the thermal coating at an angle relative to a surface of the thermal coating to create an undercut.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 2A is perspective view of a portion of an embodiment of a BOAS in accordance with this disclosure, showing undercut machined grooves disposed therein;

FIG. 2B is a radial cross-sectional view of the embodiment of FIG. 2A, showing the undercut cross-sectional profile of the machined grooves;

DETAILED DESCRIPTION

Figure 1A:
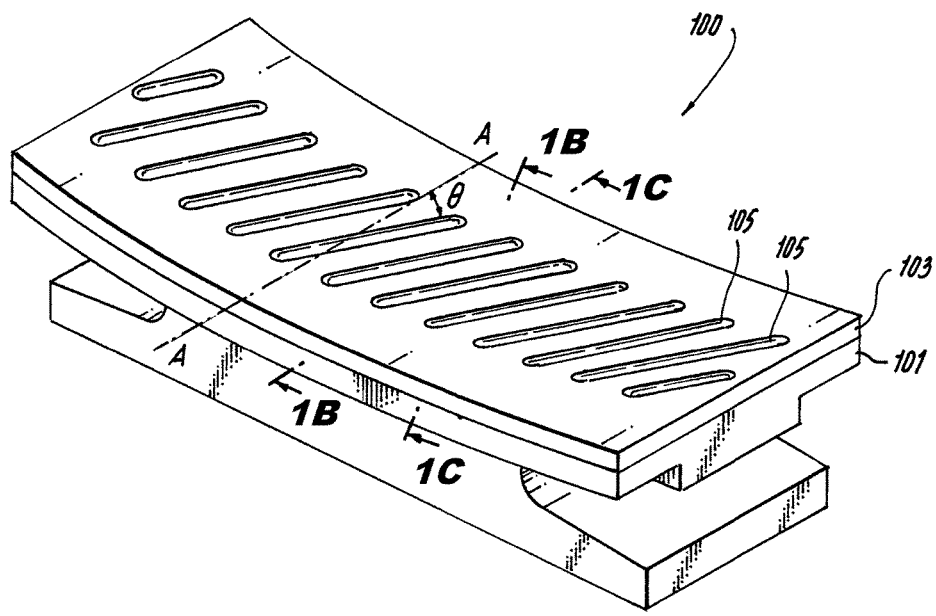
FIG. 1A is perspective view of a portion of an embodiment of a BOAS in accordance with this disclosure, showing machined grooves defined therein.

Reference will now be made to the drawings wherein like reference numerals identify similar structural features or aspects of the subject disclosure. For purposes of explanation and illustration, and not limitation, an embodiment of the blade outer air seal (BOAS) in accordance with the disclosure is shown in FIGS. 1A-1F and is designated generally by reference character 100. Other embodiments and/or portions thereof are shown in FIGS. 2A-4. The devices, systems, and methods disclosed herein can be used to reduce or prevent airflow from traveling around blade tips in a turbomachine or other suitable device.

Referring to FIGS. 1A-1F, a blade outer air seal (BOAS) 100 for a turbomachine includes a base portion 101 configured to attach to a turbomachine housing (not shown). The base portion 101 can be made of any suitable material. For example, the base portion 101 can include a metal and/or any other suitable material (e.g., ceramics, high temperature plastics). A thermal coating 103 is disposed on the base portion 101. The thermal coating can include any suitable high temperature material such as, but not limited to, a ceramic.

Figure 1B:
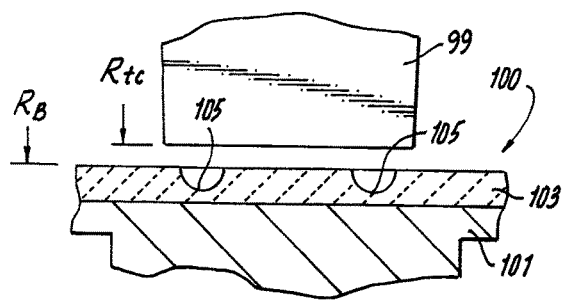
FIG. 1B is a radial cross-sectional view of the BOAS of FIG. 1A taken along line A-A.
Figure 1C:
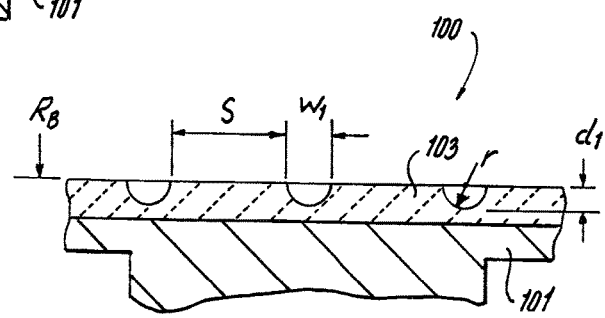
FIG. 1C is an oblique cross-sectional view of the embodiment of FIG. 1A taken along line B-B.
Figure 1D:
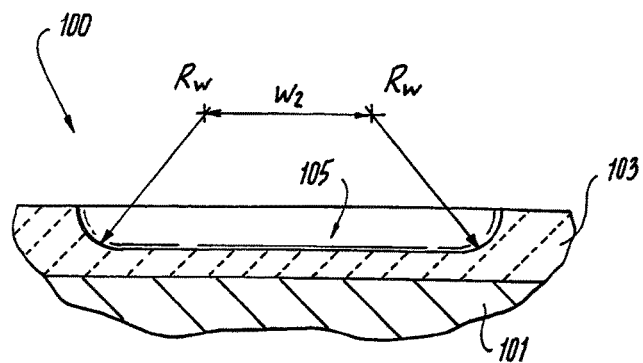
FIG. 1D is cross-sectional view of the embodiment of FIG. 1A taken along line C-C.
Figure 1E:
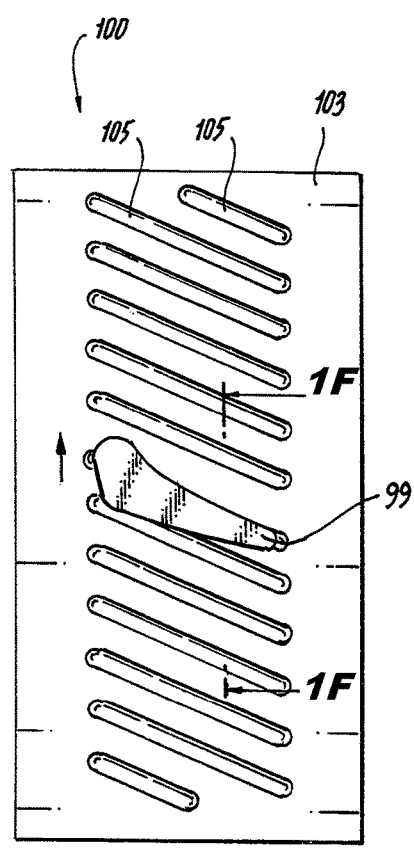
FIG. 1E is a plan view of the embodiment of FIG. 1A, schematically showing a blade tip profile moving over the BOAS.
Figure 1F:
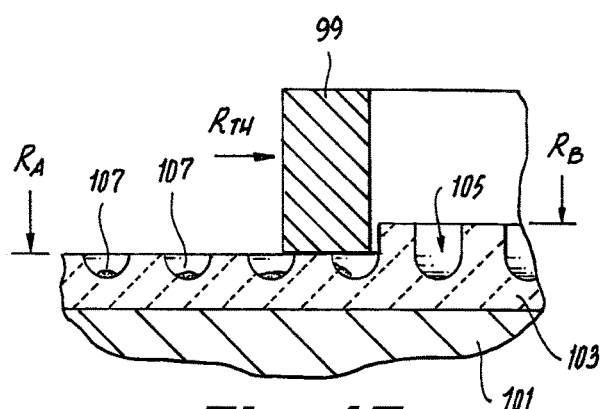
FIG. 1F is cross-sectional view of the embodiment of FIG. 1A taken along line E-E (shown in FIG. 1E schematically), showing a blade tip abrading the grooves and ridges defined in the BOAS.

The thermal coating 103 can include one or more grooves 105 (e.g., machined) defined in an external surface (e.g., a surface contacting the gas path of the turbomachine) of the thermal coating 103. As shown in FIGS. 1A-1F, the machined grooves 105 are linear in shape (e.g., a straight cut). The machined grooves 105 are at least partially radially aligned (e.g., as shown in FIGS. 1B, 1C, and 1F).

Figure 4:
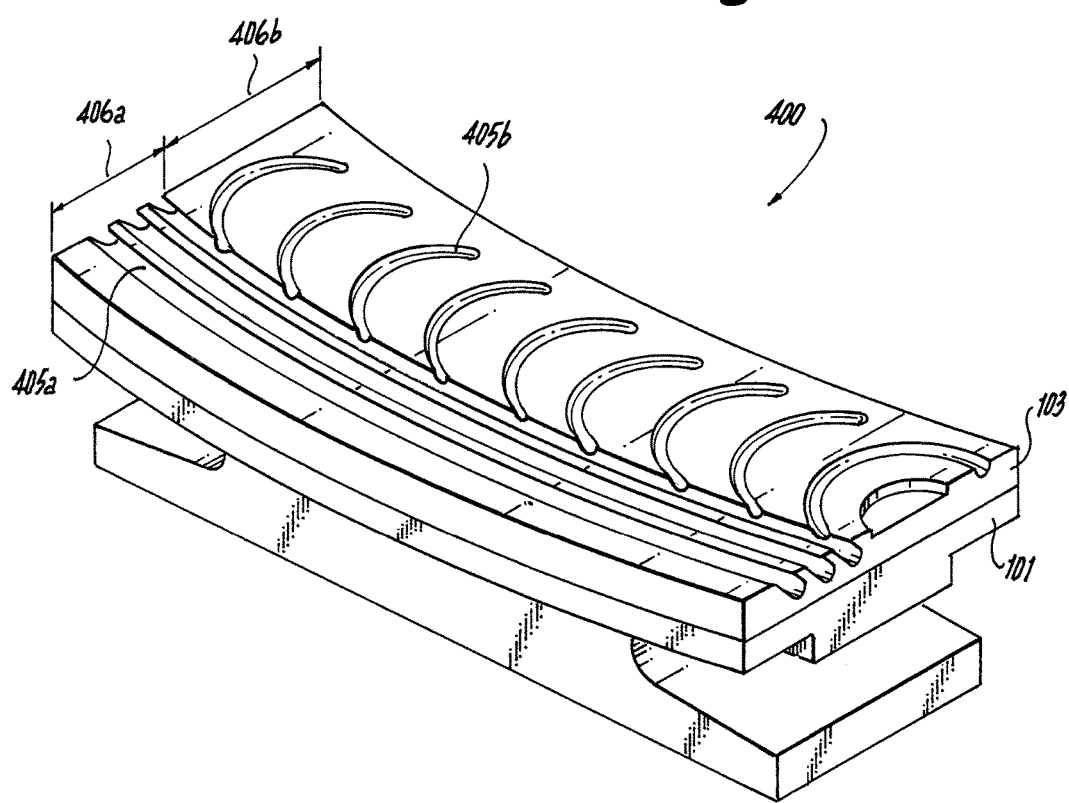
FIG. 4 is perspective view of a portion of an embodiment of a BOAS in accordance with this disclosure, showing a first type of machined grooves disposed on a first portion of the BOAS and a second type of machined grooves disposed on a second portion of the BOAS.

In embodiments, the machined grooves can be disposed at least partially axially aligned (e.g., as in grooves 405b in FIG. 4). In certain embodiments, the machined grooves 105 are disposed at an angle θ relative to the direction of the BOAS longitudinal axis A as shown in FIG. 1A. In certain embodiments, the machined grooves can include a non-linear shape (e.g., the curved grooves 405b in FIG. 4).

In certain embodiments, as shown in FIGS. 2A and 2B, BOAS 200 includes machined grooves 205 that has an undercut profile (e.g., an angled cut) created by contacting a cutting device (e.g., a circular saw blade) to the thermal coating 103 at a non-right angle relative to the surface of the thermal coating 103 (e.g., see FIG. 2B). Such undercutting can be accomplished using tactile sensitive robotic machining systems as further described below.

Figure 3A:
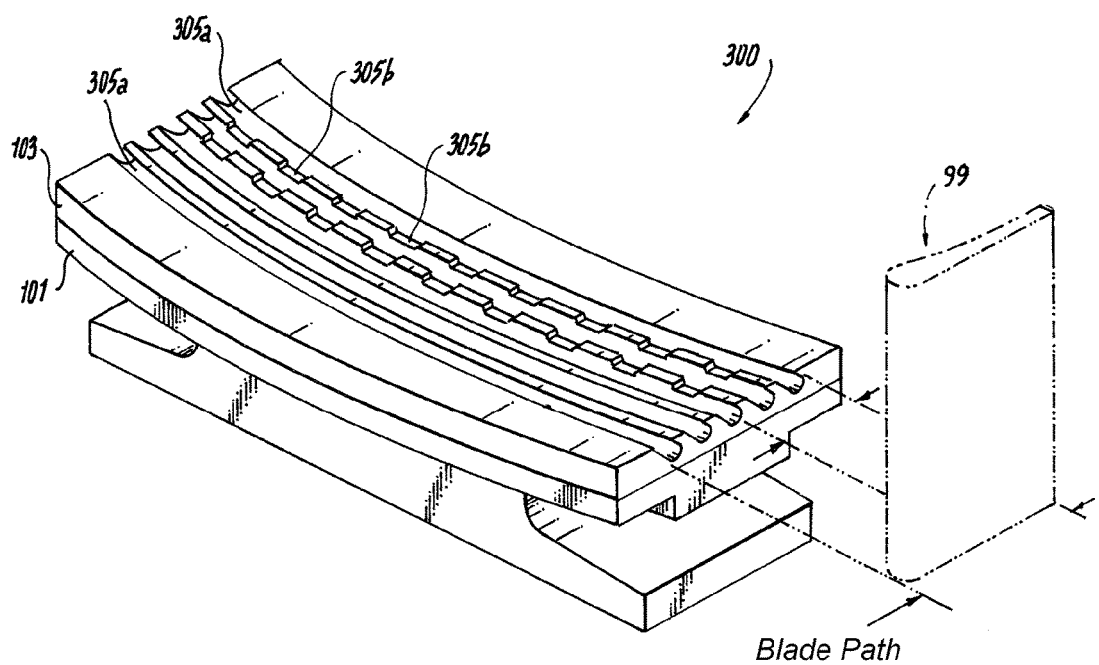
FIG. 3A is perspective view of a portion of an embodiment of a BOAS in accordance with this disclosure, showing machined grooves disposed therein with a portion of the groves including a cross-cut.
Figure 3B:
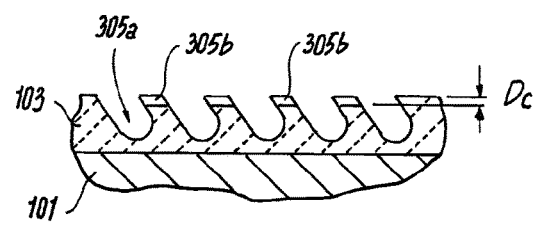
FIG. 3B is a radial cross-sectional view of the embodiment of FIG. 3A, showing the cross-sectional profile of the machined grooves with a cross-cut.

As shown in FIGS. 3A and 3B, a BOAS 300 can include one or more machined grooves 305a, 305b, wherein at least one first groove 305a is at least partially intersected by a second groove 305b. As shown, the at least one second groove 305b can cross-sect the one or more first grooves 305a at a 90 degree angle or any other suitable angle relative to the direction of the first grooves 305a.

In certain embodiments, as shown in FIG. 3A and 3B, the first grooves 305a can be machined into the thermal coating 103 to a first depth and the second grooves 305b can be machined into the thermal coating 103 at a second depth. The second depth can be shallower (as shown in FIGS. 3A and 3B), deeper, or the same depth as the first depth.

Referring to FIG. 4, in certain embodiments, a BOAS 400 can include a first portion 406a of the thermal coating 103 that has a first groove type (e.g., grooves 405a that are substantially linear and radially aligned) and a second portion 406b of the thermal coating 103 that has a second groove type (e.g., including grooves 405b which are axially aligned and/or partially non-linear). The first portion 406a and the second portion 406b can be mutually exclusive or can overlap in any suitable manner such as by intersecting as described above. In some embodiments, the first portion 406a can be configured to contact only the front portion of a turbomachine blade tip 99 (shown in FIG. 1E), and the second portion can be configured to contact a trailing portion of a turbomachine blade 99.

While some embodiments of grooves are shown in the figures, any suitable groove shapes, sizes, dimensions, orientations, combinations, and/or other characteristics are contemplated herein. For example, each groove 105 on a BOAS could be the same or different in shape, size, or the like, or a BOAS could include any suitable patterning of grooves 105.

More particularly, the orientation of the grooves and/or groove design can be a function of local aerodynamic flow conditions, such as, but not limited to, the hot flow entering the blade stage, blade airfoil shape, and tip clearance. Depending on the orientation, the grooves can create beneficial vortices in and near the groove, such that the vortices impede leakage flow between the blade tip and the shroud surface. As the main hot flow passes around the blade, the pressure, temperature, and direction of the flow change. As such, the optimal shape and direction of the grooves can change. Thus, in some cases, circumferential/radial grooves are used to good effect. As shown in some embodiments disclosed herein, an enhancement to a circumferential/radial groove may include adding some amount of axial shaping/orienting, and may improve the tip sealing ability.

The angularity of the groove shape to the surface can have an effect on how the vortices form, and where they are located. Grooves that are canted in a "forward" direction relative to the flow direction may perform better than pure radial slot type grooves in at least some embodiments.

In at least one aspect of this disclosure, a method of manufacturing a blade outer air seal (BOAS) 100 includes disposing a thermal coating 103 on a base portion 101 and forming at least one groove into the thermal coating 103. Forming can include machining or any other suitable process. In certain embodiments, machining further includes using a robotic machining system including a tactile sensing and vision sensing cutting device, both integrated in the robot controller, configured to control a groove dimension. In certain embodiments, the machining further includes contacting a cutting device to the thermal coating 103 at an angle θ relative to a surface of the thermal coating 103 to create an undercut (e.g., see FIG. 2B).

It will be understood by one having ordinary skill in the art that any suitable robotic machining system can be used to machine the grooves as disclosed herein. For example, a robotic machining system can include a tactile sensing system for proper application of force and precise dimensional control to create a suitable groove of desired shape, size, aspect ratio, etc.

The BOAS disclosed herein allow for less damage to a turbomachine blade tip 99 as shown in FIG. 1F then in traditional BOAS. As can be seen, turbomachine blade tip 99 can pass over the grooves 105 and chip away a portion of the material that define the grooves 105 so that the outer diameter of the blade tip 99 matches the inner diameter of the BOAS 100. By using grooves, less material has to be contacted by the blade tip 99, thereby reducing the amount of damage the blade tip 99 experiences during break-in. Also, grooves 105 can allow for aerodynamic advantages, as discussed above, which may enhance the seal.

The methods and systems of the present disclosure, as described above and shown in the drawings, provide for a BOAS with superior properties including reduced blade wear and/or damage during break-in. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A blade outer air seal for a turbomachine, comprising:
a base portion configured to attach to a turbomachine housing;
a thermal coating disposed on the base portion; and
at least one groove defined in an external surface of the thermal coating, wherein the at least one groove includes a first groove and at least one second groove at least partially intersecting the first groove and wherein the first groove is machined into the thermal coating to a first depth that does not extend through to the base portion and the at least one second groove is machined into the thermal coating at a second depth, the first depth being greater than the second depth.

2. A blade outer air seal of claim 1, wherein the at least one groove can be machined.

3. A blade outer air seal of claim 1, wherein the base portion includes a metal.

4. A blade outer air seal of claim 1, wherein the thermal coating includes a ceramic.

5. A blade outer air seal of claim 1, wherein the first groove and the at least one second groove are linear.

6. A blade outer air seal of claim 5, wherein the first groove and the at least one second groove are at least partially radially aligned with respect to a longitudinal axis defined by the base portion.

7. A blade outer air seal of claim 5, wherein the first groove and the at least one second groove are at least partially axially aligned with respect to a longitudinal axis defined by the base portion.

8. A blade outer air seal of claim 1, wherein the first groove or the at least one second groove is disposed at an oblique angle relative to an axial direction of the turbomachine.

9. A blade outer air seal of claim 1, wherein the first groove or the at least one second groove is disposed at right angle relative to an axial direction of the turbomachine.

10. A blade outer air seal of claim 1, wherein the first groove and the at least one second groove defines a non-linear shape.

11. A blade outer air seal of claim 1, wherein the first groove and the at least one second groove includes an undercut created by contacting a cutting device to the thermal coating at a non-right angle relative to the surface of the thermal coating.

12. A blade outer air seal of claim 1, wherein
the at least one groove is a plurality of grooves and the first groove of each of the plurality of grooves is located in a first portion of the thermal coating, and wherein the at least one second groove of each of the plurality of grooves is located in a second portion of the thermal coating, wherein the first groove of each of the plurality of grooves is being different from the at least one second groove of each of the plurality of grooves.

13. A method of manufacturing a blade outer air seal, comprising:
disposing a thermal coating on a base portion of the blade outer air seal; and
machining at least one groove into an external surface of the thermal coating, wherein the at least one groove includes a first groove and at least one second groove at least partially intersecting the first groove and wherein the first groove is machined into the thermal coating to a first depth that does not extend through to the base portion and the at least one second groove is machined into the thermal coating at a second depth, the first depth being greater than the second depth.

14. A method of claim 13, wherein the machining further includes using a robotic machining system including a tactile sensing and vision sensing cutting device, both integrated in the robot controller, configured to control dimensions of the at least one groove.

15. A method of claim 13, wherein the machining further includes contacting a cutting device to the thermal coating at an angle relative to a surface of the thermal coating to create an undercut.

* * * * *